(12) United States Patent
Moulton et al.

(10) Patent No.: US 11,260,336 B2
(45) Date of Patent: Mar. 1, 2022

(54) ACTIVE WET SCRUBBING FILTRATION SYSTEM

(71) Applicant: ENTEGRIS, INC., Billerica, MA (US)

(72) Inventors: Tyler Moulton, Grafton, MA (US); James Britto, Westport, MA (US); Thomas Leblanc, Mendon, MA (US); John C. Gaudreau, Chepachet, RI (US)

(73) Assignee: ENTEGRIS, INC., Billerica, MA (US)

( * ) Notice: Subject to any disclaimer, the term of this patent is extended or adjusted under 35 U.S.C. 154(b) by 170 days.

(21) Appl. No.: 16/694,238

(22) Filed: Nov. 25, 2019

(65) Prior Publication Data

US 2020/0197854 A1    Jun. 25, 2020

Related U.S. Application Data

(60) Provisional application No. 62/782,946, filed on Dec. 20, 2018.

(51) Int. Cl.
*B01D 47/00* (2006.01)
*B01D 47/06* (2006.01)
(Continued)

(52) U.S. Cl.
CPC ............. *B01D 47/06* (2013.01); *B01D 47/10* (2013.01); *B01D 47/14* (2013.01); *B01D 53/18* (2013.01);
(Continued)

(58) Field of Classification Search
CPC ........ B01D 47/00; B01D 47/06; B01D 47/10; B01D 47/14
See application file for complete search history.

(56) References Cited

U.S. PATENT DOCUMENTS 3,358,413 A     12/1967  Kalika
4,008,056 A  *   2/1977  Potter .................... B01D 47/06
                                                       95/220
(Continued)

FOREIGN PATENT DOCUMENTS

CN          104096434 A      10/2014
CN          205252837 U       5/2016
(Continued)

*Primary Examiner* — Robert A Hopkins
(74) *Attorney, Agent, or Firm* — Entegris, Inc.

(57) ABSTRACT

An active wet scrubbing filtration system for decontamination of a gas stream comprises components including one or more of: a) a vortexing apparatus which induces a contaminant-bearing gas into a helical flow; b) an initial scrubbing fluid spray section configured so as to project a spray of scrubbing fluid into the contaminant-bearing gas stream; c) an absorption structure; d) a condenser; and e) first and second scrubbing fluid decontamination systems that may be engaged or disengaged independently of each other. In some embodiments, the worksite comprises a clean room or one or more a semiconductor processing tools, which may include photolithography tools or photolithography tool clusters. In some embodiments, the active wet scrubbing filtration system may be useful in cleaning and recycling air or other process gasses for use in clean rooms or semiconductor processing tools.

18 Claims, 6 Drawing Sheets

(51) Int. Cl.
  *B01D 47/10*  (2006.01)
  *B01D 47/14*  (2006.01)
  *B01D 53/18*  (2006.01)
  *B01D 53/75*  (2006.01)
  *B01D 53/78*  (2006.01)

(52) U.S. Cl.
  CPC .............. *B01D 53/75* (2013.01); *B01D 53/78* (2013.01); *B01D 2253/102* (2013.01); *B01D 2257/302* (2013.01); *F23J 2219/40* (2013.01)

(56) References Cited

U.S. PATENT DOCUMENTS

| | | |
|---|---|---|
| 6,761,753 B2 | 7/2004 | Kishkovich |
| 7,306,650 B2 * | 12/2007 | Slayzak ................. B01D 47/14 95/231 |
| 7,329,308 B2 | 2/2008 | Goodwin |
| 8,968,450 B1 | 3/2015 | Hepburn |
| 2004/0023419 A1 | 2/2004 | Kishkovich |
| 2010/0175552 A1 | 7/2010 | Ghosh |
| 2013/0068105 A1 | 3/2013 | Laffler |
| 2016/0332113 A1 | 11/2016 | Jenkins |

FOREIGN PATENT DOCUMENTS

| | | |
|---|---|---|
| CN | 205287969 U | 6/2016 |
| CN | 106390706 A | 2/2017 |
| CN | 207187414 U | 4/2018 |
| JP | 2012217974 A | 11/2012 |
| KR | 100972921 B1 | 7/2010 |
| KR | 100980303 B1 | 9/2010 |

* cited by examiner

ACTIVE WET SCRUBBING FILTRATION SYSTEM

This application claims the benefit of U.S. Application No. 62/782,946 filed on Dec. 20, 2018, which is hereby incorporated by reference in its entirety.

FIELD OF THE DISCLOSURE

This disclosure relates to active wet scrubbing filtration systems which may be useful in cleaning and recycling air or other process gasses for use in clean rooms or semiconductor processing tools.

BACKGROUND OF THE DISCLOSURE

The quality of air in semiconductor processing tools is a major concern in the semiconductor manufacturing industry. Photolithography tools in particular require air of appropriate temperature, humidity and cleanliness (both with respect to particulates and molecular contaminants).

Traditional approaches to air humidity and temperature control use an air conditioning device that, for example, can exchange heat with an air stream and remove or add water vapor to the air stream.

The removal of contaminants from an air stream and, in particular, the removal of molecular contaminants, is traditionally performed with another device. For example, traditional approaches typically involve the use of activated carbon filters and/or combination of adsorptive and chemisorptive media to control contamination in conjunction with a temperature and/or humidity controlling air-handling device to manage temperature and humidity of delivered air.

Traditional approaches to contaminant removal employ filters, or a series of filters, to remove particulates and molecular contaminants. Particulates are generally viewed as contaminates having a size of greater than about 0.1 microns. Molecular contaminants are generally viewed as those contaminants that form deposits (e.g., organics) and/or inhibit process performance (e.g., bases).

Filters, however, have several problems. Filters increase pressure resistance and thereby increase the pressure drop in the air handling system for a processing tool. Filters also have a limited service life, requiring that the filters be eventually removed and replaced. Such replacement can require downtime of the associated semiconductor processing tools to replace the filter elements and add to the overall cost of ownership of the process tool.

In addition, many filters have a limited capability in mitigating optics-damaging volatile organic compounds, especially in the lower molecular weight ranges because lower molecular weight organics are typically difficult to adsorb. Increasing the capability and/or capacity of a filter generally means adding greater amounts of adsorptive media, which in turn further increases pressure resistance and cost.

The filtration media of a filter may itself introduce particulate contamination requiring downstream particulate filtration. In addition, the filtration media of a filter may itself introduce chemical contamination. For example, traditional filtration methods involving the use of highly acidic medias may introduce damaging acid anions into the air stream, such as sulfur containing oxides, such as, for example, $SO_2$.

In addition, the filter media of a filter, especially of some traditional chemical filters, can create problems with air stream temperature and humidity control. For example, highly acidic sulfonated medias (traditionally used for the removal of basic compounds, such as ammonia and amines) are by their chemical nature prone to reversible exothermic reactions with water (for example, hydration reaction). This heat and humidity interaction causes difficulty in the feedback control of air stream temperature and humidity. Difficulties in air stream humidity and temperature control are especially problematic in photolithography, as the typical objective is to manage temperature and/or humidity variation to ultra-low levels (for example, variations of less than tens of a milliKelvin in temperature, and variations of less than a few tenths of a percent in relative humidity). Difficulties in air stream humidity and temperature control may substantially increase the time necessary to achieve control stability, for example, during a start-up process of a photolithography tool. An increase in the time to achieve control stability is directly related to tool availability, a production metric of concern to the semiconductor industry.

SUMMARY OF THE DISCLOSURE

Briefly, the present disclosure provides an apparatus for decontamination of a gas stream and methods of its use, the apparatus comprising: a) a gas stream input to receive a contaminant-bearing gas stream; b) a vortexing apparatus receiving the contaminant-bearing gas stream from the gas stream input and configured to induce the contaminant-bearing gas into a helical flow; c) an absorption structure equipped with a scrubbing fluid application system to apply a flow of scrubbing fluid to the absorption structure; wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream; and d) a gas stream output receiving the at least partly decontaminated gas stream and configured to deliver the at least partly decontaminated gas stream. In some embodiments, the vortexing apparatus is a passive vortexing apparatus comprising one or more stationary vanes, whereas in other embodiments the vortexing apparatus may be an active vortexing apparatus comprising one or more mobile vanes. Typically, the helical flow is around an axis parallel to a net motion of the contaminant-bearing gas stream.

In another aspect, the present disclosure provides an apparatus for decontamination of a gas stream, which may also include elements of the apparatus described above, comprising: a) a first scrubbing fluid decontamination system operably connected to receive scrubbing fluid exiting the absorption structure and configured to decontaminate the scrubbing fluid and to return the scrubbing fluid to the scrubbing fluid application system for reuse; and b) a second scrubbing fluid decontamination system operably connected to receive scrubbing fluid exiting the absorption structure and configured to decontaminate the scrubbing fluid and to return the scrubbing fluid to the scrubbing fluid application system for reuse, wherein the first and the second scrubbing fluid decontamination systems may be engaged or disengaged independently of each other.

In another aspect, the present disclosure provides an apparatus for decontamination of a gas stream, which may also include elements of the apparatus described above, comprising: a) an initial scrubbing fluid spray section positioned before an absorption structure such that the contaminant-bearing gas stream passes through the initial scrubbing fluid spray section before passing into the absorption structure, wherein the initial scrubbing fluid spray section is configured so as to project a spray of scrubbing fluid into the contaminant-bearing gas stream. Where a vortexing apparatus is also present, the initial scrubbing fluid spray section is positioned between the vortexing apparatus and the absorption structure such that the contaminant-bearing gas stream induced into a helical flow by the vortexing apparatus passes through the initial scrubbing fluid spray section before passing into the absorption structure. Typically, the scrubbing fluid application system and initial scrubbing fluid spray section are located at opposite ends of the absorption structure.

In another aspect, the present disclosure provides an apparatus for decontamination of a gas stream, which may also include elements of the apparatus described above, comprising: a) a condenser configured such that the at least partially decontaminated gas stream exiting an absorption structure contacts the condenser which at least partially removes dissolved or entrained scrubbing fluid from the at least partly decontaminated gas stream. Typically, the apparatus for decontamination of a gas stream also includes a condensed scrubbing fluid recycling apparatus adapted to collect condensed scrubbing fluid removed from the at least partly decontaminated gas stream by the action of the condenser and to return the condensed scrubbing fluid to the scrubbing fluid application system for reuse as scrubbing fluid.

In some embodiments, the contaminant-bearing gas stream comprises air. In some embodiments, the scrubbing fluid comprises water, de-ionized (DI) water, or a chemisorptive aqueous solution. In some embodiments, the worksite comprises a clean room or one or more asemiconductor processing tools, which may include photolithography tools or photolithography tool clusters. In some embodiments, the contaminant-bearing gas stream is drawn from a worksite and wherein the at least partly decontaminated gas stream is returned to the worksite.

The preceding summary of the present disclosure is not intended to describe each embodiment of the present disclosure. The details of one or more embodiments of the invention are also set forth in the description below. Other features, objects, and advantages of the invention will be apparent from the description and from the claims.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

Figure 1:
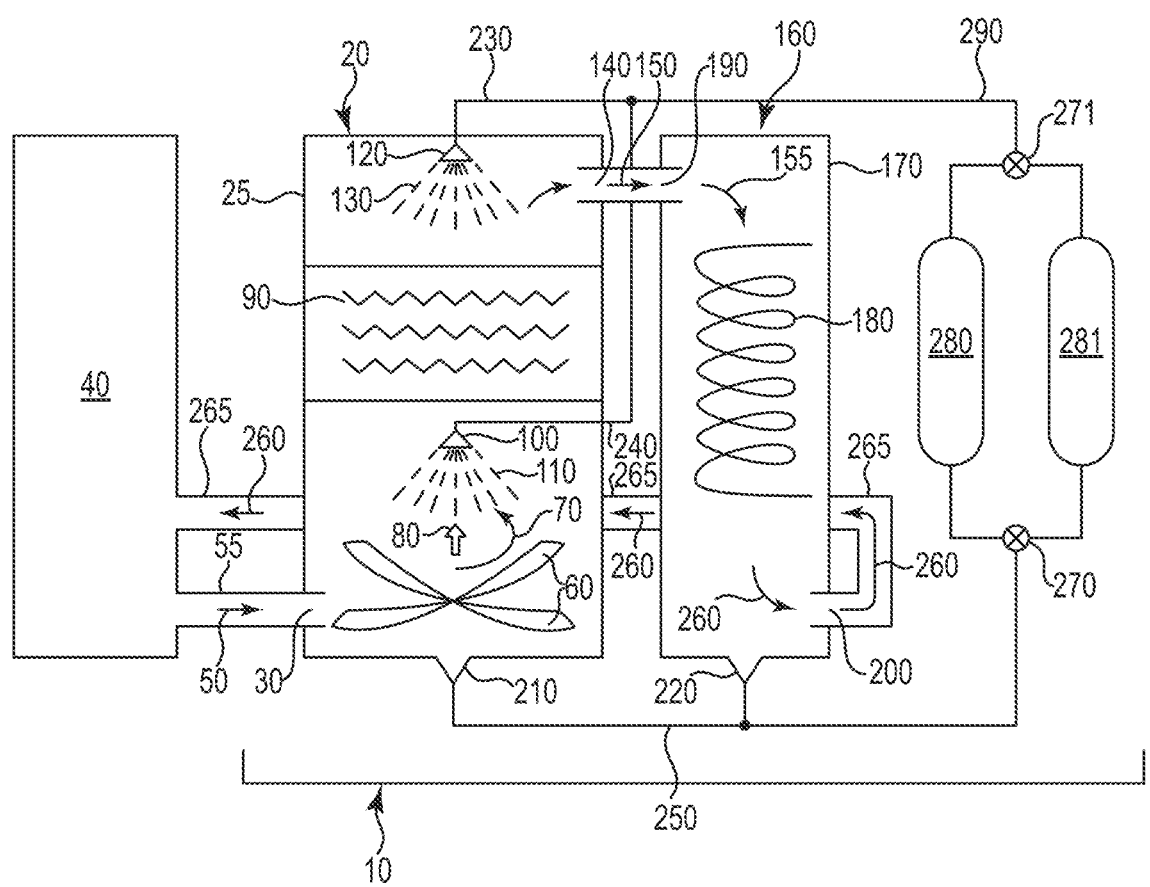
FIG. 1 is a schematic depiction of one embodiment of an active wet scrubbing filtration system according to the present disclosure.

The present disclosure provides active wet scrubbing filtration systems which may be useful in cleaning and recycling air or other process gasses for use in clean rooms or semiconductor processing tools.

The systems of the present disclosure utilize a scrubbing fluid, to reduce the concentration of one or more contaminates in the gas stream. Preferred scrubbing fluids included, but are not limited to water, de-ionized (DI) water and chemisorptive aqueous solutions. Other suitable scrubbing fluids may include, but are not limited to, water, oils, nonpolar solvents and polar solvents such as, for example, alcohols. In embodiments using a scrubbing fluid comprising de-ionized water, it is preferred that the de-ionized water has a resistivity in the range from about 100,000 ohm centimeters to about 18,000,000 ohm centimeters.

In preferred embodiments, the scrubbing fluid wets the surface of an absorption structure (e.g., as droplets and/or a film) and one or more contaminants are removed from the gas stream by sorption in the scrubbing fluid. For example, one or more contaminants can be removed from the gas stream by absorption, adsorption, dissolution, or combinations thereof, in the scrubbing fluid. Adsorption can include, but is not limited to, chemisorption and physisorption. In addition, species can be removed by sorption into the scrubbing fluid, onto the surface of the scrubbing fluid, or a combination of both.

The systems and methods of the present disclosure can be used on a wide variety of molecular contaminants from a wide variety of gas streams used in semiconductor processing tools. In various embodiments, molecular contaminants which can be removed include, but are not limited to, acids, bases, high and low molecular weight organic compounds, and compound classes that include, but are not limited to, microelectronic dopants, molecular condensables and refractory compounds. In various embodiments, the concentration of one or more contaminants can be reduced in gas streams including, but not limited to, streams of air, clean dry air (CDA), oxygen, nitrogen, and one or more noble gases.

High molecular weight organics include compounds having greater than about six carbon atoms (C compounds). Low molecular weight organics include compounds having about six carbon atoms or less (C compounds). Molecular condensables include high boiling point (i.e., greater than about 150° C.) organic materials. Molecular condensables can, for example, harm optical elements of a photolithography tool by adsorption on the optical elements followed by radical condensation or polymerization induced by exposure to deep ultra violet (DUV) light (e.g., 193 nm and 157 nm light). Refractory materials are compounds containing atoms forming nonvolatile or nonreactive oxides, for example, but not limited to, phosphorous (P), silicon (Si), sulfur (S), boron (B), tin (Sn), aluminum (Al). These contaminants, when exposed to DUV light, can form refractory compounds resistant to traditional photolithography tool cleaning approaches and even condense irreversibly on optical surfaces. Refractory materials include refractory organics such as, for example, silanes, siloxanes (such as, e.g., hexamethyldisiloxane), silanols, and iodates. Further examples of molecular contaminants whose concentration in a gas stream can be reduced by various embodiments of systems and methods of the present disclosure are listed in Table 1.

TABLE 1

Ammonia
Sulfuric Acid
Nitrous acid
Nitric acid
Phosphoroganics
Trimethylsilanol (TMS)
Dimethyl Sulfoxide (DMSO)
Hexamethyldisiloxane (HMDSO)
Silane, Tetramethoxy (TEOS)
Silane, Dimethoxydimethyl
Benzene
Hexane, 3-Methyl
2-Heptane
Silane, Trimethoxymethyl
Hexane, 2,5-Dimethyl
Toluene
Propanoic acid, 2-hydroxy-ethyl ester
Propylene glycol methyl ether acetate (PGMEA)
Dipropylene glycol meethyl ether (DPGME)
Propylene glycol methyl ether (PGME)
Ethylbenzene
n-Propylbenzene
Cyclohexane
Xylenes
Styrene
1,2,3 Trimethylbenzene
1,3,5 Trimethylbenzene
Cyclohexanone
3-Heptanone
Octane, 2,6-Dimethyl
Cyclohexane, (1-Methylethyl)
Nonane
Octane, 2,5,6-Trimethyl
Octane, 2,2,7,7-Tetramethyl
Octane, 2,2,6-Trimethyl
Benzene, 1-Ethyl, 3-Methyl
Decane, 2-Methyl
Benzene, 1-Ethyl, 2-Methyl
Benzaldehyde
Carbamic acid, methyl-, phenyl ester
Heptane, 2,2,4,6,6-Pentamethyl
Decane, 2,2-Dimethyl
Decane, 2,2,9-Trimethyl
Nonane, 3,7-Dimethyl
Decane, 5,6-Dimethyl
Decane, 2,3-Dimethyl
Nonane, 3-Methyl-5-propyl
Decane, 2,6,7-Trimethyl
Heptane, 4-Ethyl-2,2,6,6-Tetramethyl
Undecane, 2,5-Dimethyl
Undecane, 4,6-Dimethyl
Undecane, 3,5-Dimethyl
Undecane, 4-methyl
Nonane, 3-methyl-5-propyl
Undecane, 5,7-Dimethyl
Undecane, 3,8-Dimethyl
Dodecane, 2,5-Dimethyl
Heptane, 2,2,3,4,6,6-Hexamethyl
Dodecane, 2,6,10-Trimethyl
Tridecane, 5-Methyl
Tridecane, 4-Methyl
Dodecane
Benzoic acid
Cyclotetrasiloxane, Hexamethyl TABLE 1-continued Cyclotetrasiloxane, Octamethyl
2.5 Cyclohexadiene-1,4-dione, 2,5-diphenyl The systems of the present disclosure can also be used to remove particulates from gas streams used in semiconductor processing tools. In various embodiments, the present disclosure facilitates removing particulates with an average particle size of less than about 0.01 microns. In various embodiments, the present disclosure facilitates removal of particulates with an average particle size of less than about 0.02 microns, and in various embodiments, the present disclosure facilitates removal of particulates with an average particle size of less than about 0.1 microns.

The scrubbing fluid is introduced to the absorption structure in sufficient volume and temperature to form a liquid which wets and flows over the surfaces of the absorption structure. The scrubbing fluid may be introduced in any suitable manner, including as an aerosol, jet, or other flow, from nozzles, spray heads, or the like.

The absorption structure is a fluid permeable, high surface area structure which brings the contaminant-bearing gas stream into intimate contact with scrubbing fluid. The absorption structure can comprise a loose packed-bed structure, structured packed-bed structure, or a combination of both. Preferably the absorption structure is a loose packed-bed structure, such as for example, Q-Pack, Lanpack and/or Nupack all manufactured by Lantec, Inc., Raschig rings, Pall rings, Berl Saddles, Inatolex saddles, Flexrings, Ballast rings, and Cascade rings. Examples of structured packed-bed structures include, but are not limited to, Gem Pack™ cartridges, and Glitsch EF-25A Grid™, manufactured by Glitsch, Inc., of Dallas, Tex. The design of the absorption structure is preferably such that there is sufficient residence time of the gas stream to allow for mass transfer of molecular contaminants from the output gas stream to the scrubbing fluid on the absorption structure.

The systems and methods of the present disclosure can be used, for example, on a single semiconductor tool, a cluster of tools (such as, for example, a photolithography cluster of an exposure tool and photoresist coat/develop tool), or a tool set (such as, for example a development track and exposure tool). In various preferred embodiments, the present invention provides air handling and chemical filtration systems that facilitate reducing the cost of ownership for contamination control compared to conventional methods of adsorptive filtration.

In various embodiments, the present disclosure reduces or eliminates some of the problems associated with traditional filters by providing a chemical filtration system that can repeatedly regenerate a filtering media without the semiconductor tool downtime associated with replacing traditional filter elements. In the present disclosure, the filtering media includes the scrubbing fluid.

In various embodiments, the present disclosure reduces or eliminates some of the problems associated with traditional filters by providing a chemical filtration system that utilizes a filtering media that does not substantially generate particulates such as are associated with traditional filter elements. In the present disclosure, the filtering media includes the scrubbing fluid.

In various embodiments, the present disclosure reduces or eliminates some of the problems associated with traditional filters by providing a chemical filtration system that can remove molecular contaminants without the humidity and temperature control difficulties created by some traditional filter elements. For example, by the use of a scrubbing fluid as a filtering media in accordance with the present disclosure, various embodiments of the present disclosure avoid introducing damaging concentrations of acids, bases, or both into the gas stream. In various preferred embodiments, the present disclosures approach to temperature and humidity control is more capable of handling disturbances in upstream temperature and humidity than traditional systems.

In various embodiments, the present disclosure provides an integrated air handling and chemical filtration system for semiconductor tools. Such integrated systems can facilitate providing a system with a smaller footprint than the combined footprint of traditional air handling units and filtration systems. In addition, in various embodiments, an integrated air handling and chemical filtration system of the present disclosure can facilitate reducing capital and operating cost by combining two separate gas stream processing needs (air conditioning and chemical filtration) in one apparatus, simplifying the supply chain, ownership, support and maintenance.

In some embodiments, the present disclosure reduces a broad spectrum of chemical contamination from the gas stream serving a photolithography tool, including, but not limited to, contaminants such as listed in Table 1. In addition, in some embodiments, the present disclosure provides systems and methods that can supply a gas stream to a photolithography tool with very small levels of temperature and humidity variation. For example, in various preferred embodiments, the present disclosure provides a gas stream with a temperature variation less than about 10 millikelvin under constant pressure and flow rate conditions and a relative humidity variation of less than about 0.1%. In various embodiments, the present disclosure provides a gas stream with a temperature variation in the range from about 5 millikelvin to about 20 millikelvin under constant pressure and flow rate conditions and a relative humidity variation in the range from about 0.05% to about 0.5%. In various embodiments, the present disclosure provides a combined air handling and filtration apparatus that can provide temperature control, humidity control and filtration for a gas stream within a pressure within about 10 inches w.c. (water column) and a flow rate in the range from about 1 cubic feet per minute (CFM) to about 100,000 CFM; and preferably, a flow rate in the range from about 200 cubic feet per minute (CFM) to about 10,000 CFM.

In certain embodiments, the disclosure provides a combined air handling and chemical filtration apparatus for a photolithography tool cluster used in the manufacture of semiconductor devices that is sensitive to molecular contamination. In various embodiments, the combined air handling and filtering system removes molecular contamination which may include acids, bases, high and low molecular weight aromatic and aliphatic organics, and compound classes that include, but are not limited to, microelectronic dopants, molecular condensables and refractory compounds.

In various embodiments, the systems and methods further include provide metrology information. For example, in one embodiment, the present disclosure provides a system that can measure, either qualitatively, quantitatively, or both, the concentration of one or more contaminants in a gas stream from a semiconductor processing tool and the gas returned to the semiconductor processing tool by a system of the disclosure. In one embodiment, the disclosure provides methods for air handling and filtration that use metrology information to provide a gas stream with temperature controlled, relative humidity controlled, contaminant reduced, or combinations thereof to a semiconductor tool. Alternately, the concentration of one or more contaminants in scrubbing fluid exiting the absorption structure may be monitored as an indication of concentration in the gas stream.

In some embodiments, the scrubbing fluid may be cleaned in a scrubbing fluid decontamination system. Two scrubbing fluid decontamination systems may be provided for alternate use, with appropriate valves and conduits for selection of one or the other scrubbing fluid decontamination system. This dual system allows one scrubbing fluid decontamination system to be regenerated or serviced in situ while the other is in use without interrupting the operation of the active wet scrubbing filtration system or the process it serves.

Scrubbing fluid decontamination systems may decontaminate scrubbing fluid using conventional methods, which may include, for example, ion exchange resins, mixed bed resin bottles, organic membrane separation, liquid-phase carbon adsorption for organics removal, and particle filtration for particulate removal. Scrubbing fluid cleaning can include, for example, photocatalysis on immobilized $TiO_2$ or $TiO_2$ slurry, and advanced oxidation processes, such as, for example, processes which include $H_2O_2$, $O_3$, Fenton's reagent, and ionizing radiation. In various embodiments, the DI water is also treated by the recirculation unit to prevent biological fouling of the absorption structure and other wetted sections of the system. Suitable treatments to prevent biological fouling include, but are not limited to irradiation of the DI water with ultraviolet (UV) light in the C band (about 200 nm to about 290 nm), ozonization, and peroxidation. In some embodiments, UV lights can also be used to break up biological contaminants or other organic compounds and can be placed, for example, in a holding tank or the bead column containing the vortexing apparatus. In some embodiments, resin treated carbon can be included in the system to break the wall structure of biological contaminants. In some embodiments, the uv lights and the resin treated carbon can be used alone or in combination.

In some embodiments, the scrubbing liquid flow path may contain a mechanism for continuous and regenerative desalination. In preferred configurations, the system may contain a modified form of membrane capacitive deionization (MCDI), where the cation exchange and anion exchange membranes are alternately arranged with mixed ion-exchange resin packed between them. This stack includes electrodes on each end to which a DC voltage is applied, creating an electric field across the membranes. This can be combined with, but is not limited, ion exchange adsorbent beds and/or reverse osmosis systems.

In some embodiments, the scrubbing liquid is decontaminated by passage through an adsorbent bed, which may comprise granular activated carbon (GAC). Scrubbing liquid adsorbent beds can be regenerated in-situ using purified process gas (including but not limited to XCDA, N2, or He) flowing through the adsorbent bed and directed to waste, in combination with thermal conductive heating to provide conditions for efficient thermal desorption of deposited contaminants. In preferred configurations, the system contains two or more scrubbing liquid adsorbent beds, which enables one or more beds to be regenerated while one or more beds are in operation, providing continuous scrubbing liquid purification. Additional methods of adsorption/desorption, including but not limited to pressure and supercapacitive swing adsorption, may also be applicable.

In some embodiments, the contaminant-bearing gas stream entering the scrubbing tower passes through a vortexing apparatus. The vortexing apparatus induces the contaminant-bearing gas stream to move in a helical flow. The helical flow is around an axis generally parallel to the net motion of the gas stream into the absorption structure. In addition, the gas stream input may be configured to enter the scrubbing tower at an acute angle so as to contribute to inducing a helical flow. Without wishing to be bound by theory, Applicants believe that the helical flow induced by the vortexing apparatus increases residence time of the gas stream in absorption structure, resulting in greater removal of contaminants from the gas stream. The vortexing apparatus can be of any effective configuration. In various embodiments contemplated herein, the vortexing apparatus may be a passive vortexing apparatus comprising one, two, three, four, or more stationary vanes. In various other embodiments contemplated herein, the vortexing apparatus may be an active vortexing apparatus comprising one, two, three, four, or more mobile vanes, which may be driven by a motor or other drive mechanism. In some embodiments, the contaminant-bearing gas stream is driven into the vortexing mechanism by one or more pumps, fans, or impellers which may be located before, after, or in the scrubbing tower, or combinations thereof. Typically, the inner surface of the scrubbing tower is generally cylindrical in order to support and reinforce the helical flow of the gas stream.

In some embodiments, the contaminant-bearing gas stream entering the scrubbing tower passes through an initial scrubbing fluid spray section. The initial scrubbing fluid spray section comprises one or more initial spray head(s) configured so as to project a spray of scrubbing fluid into the contaminant-bearing gas stream, thereby removing contaminants from the gas stream into scrubbing fluid. Active wet scrubbing filtration systems according to the present disclosure may include a vortexing apparatus, an initial scrubbing fluid spray section, or both. Without wishing to be bound by theory, Applicants believe that where an initial scrubbing fluid spray section is used in conjunction with a vortexing apparatus, the vortexing apparatus increases residence time of the gas stream in the initial scrubbing fluid spray section resulting in greater removal of contaminants from the gas stream. The scrubbing fluid application system and initial scrubbing fluid spray section (when present) are distinct and separate structures. In some configurations, the scrubbing fluid application system and initial scrubbing fluid spray section are located at opposite ends of the absorption structure. For example, where the contaminant-bearing gas stream enters the scrubbing tower at a lower point and passes upward through the absorption structure, the scrubbing fluid application system may wet the absorption structure from above, allowing gravity to assist in distributing scrubbing fluid throughout the absorption structure, and the initial scrubbing fluid spray section may be located below the absorption structure, so as to address the entering contaminant-bearing gas stream. In such a configuration, the initial scrubbing fluid spray section does not significantly wet the absorption structure.

In some embodiments, the at least partly decontaminated gas stream exiting the scrubbing tower may be returned to the worksite or external process for use. In other embodiments, the decontaminated gas stream exiting scrubbing tower then passes into a condenser section. The condenser section may include any suitable condenser apparatus, such as a condenser coil functionally connected to external refrigeration unit, and may be equipped with structures that increase the area of contact with the decontaminated gas stream such as fins, vanes, gas-permeable structures, and the like. As the at least partly decontaminated gas stream passes over the condenser apparatus, the condenser apparatus at least partially removes dissolved or entrained scrubbing fluid from the decontaminated gas stream. In some embodiments, condensed scrubbing fluid collects in condensed scrubbing fluid drain from which it passes into scrubbing fluid return conduit. In this way, essentially all scrubbing fluid may be recollected, either from the scrubbing tower or the condenser section. This feature enables quantitative measurement of contaminants removed from the gas stream by measuring their concentration in the combined collection of used scrubbing fluid from the scrubbing tower and the condenser section.

Alternately, the decontaminated gas stream exiting scrubbing tower may pass into a collection device other than a condenser to remove liquid droplets of scrubbing fluid. In some such embodiments, suitable approaches and devices for remove liquid droplets of scrubbing fluid may include collection by coalescing media, collection by vane separators, collection by an extended surface of a packed bed, collection by adsorbant media, or collection by passage of the gas through a porous membrane. An additional approach may include the use of liquid desiccant, wherein a liquid desiccant solution (typically, lithium chloride) is sprayed through an air stream to absorb moisture from the air stream and remove energy from the system. Conditions can be varied by changing the concentration of the solution and can also act as a biocide for the conditioned air. The solution then is regenerated by heating it, where it loses its moisture before spraying it across the air stream again. A hot, moist waste-air stream also is exhausted from the regenerator. An additional approach may include the use of heating coils or gas burners. An additional approach may include the use of solid desiccant such as silica gel, wherein humid air is drawn through the desiccant and moisture is absorbed. As the desiccant reaches capacity, it may be moved into a re-activation air stream, where it desorbs the moisture, using waste heat or an exhaust air stream. An additional approach may include the use of semi-permeable water exclusion polymer membranes, either by direct flow through or by tangential flow or osmosis. An additional approach may include the use of electrostatic apparatus utilizing electrostatic fields to separate moisture vapor from air.

In various embodiments, the systems and methods of the present disclosure can be combined with one or more of the systems described in US 2004/0023419; U.S. Pat. Nos. 6,761,753; and 7,329,308; the contents of which are incorporated herein by reference in their entirety.

The foregoing and other features and advantages of the system and method for air handling and chemical filtration of gas streams for semiconductor processing tools will be apparent from the following more particular descriptions of embodiments of the system as illustrated in the accompanying drawings.

INDEX OF REFERENCE CHARACTERS FOR
FIGS. 1-4

10 active wet scrubbing filtration system
20 scrubbing tower
25 scrubbing tower housing
30 gas stream input
40 external process
50 contaminant-bearing gas stream
55 input duct
60 vortexing apparatus
62 outer vortexing vanes
64 inner vortexing vanes
66 support column
68 full radius vortexing vanes 70 helical flow
80 net motion of the gas stream
90 absorption structure
100 initial spray head
110 spray of scrubbing fluid
120 absorption structure spray head
130 spray of scrubbing fluid
140 gas stream output
150 at least partly decontaminated gas stream
155 at least partly decontaminated gas stream
160 condenser section
170 condenser section housing
180 condenser apparatus
190 condenser input
200 condenser output
210 scrubbing fluid drain
220 condensed scrubbing fluid drain
230 scrubbing fluid supply conduits
240 scrubbing fluid supply conduits
250 scrubbing fluid return conduit
260 dried and at least partly decontaminated gas stream
265 return duct
270 valve
271 valve
280 scrubbing fluid decontamination system
281 scrubbing fluid decontamination system
290 scrubbing fluid supply conduit With reference to FIG. 1, one embodiment of an active wet scrubbing filtration system 10 according to the present disclosure includes scrubbing tower 20. Scrubbing tower 20 includes scrubbing tower housing 25, gas stream input 30, absorption structure 90, which is wetted with a spray of scrubbing fluid 130 from one or more absorption structure spray head(s) 120, and gas stream output 140, and in various embodiments comprises additional elements addressed below.

Gas stream input 30 is configured to receive contaminant-bearing gas stream 50 from external process 40 through input duct 55. External process 40 may be any suitable process that tends to contaminate a functional gas stream and is capable of reusing a functional gas stream once it is decontaminated. In various embodiments, external process 40 may represent one or more worksites which may be one or more semiconductor processing systems. In various embodiments, external process 40 may be a clean room, wherein contaminant-bearing gas stream 50 may be air present in the interior of the clean room; or external process 40 may be an apparatus for processing workpieces such as semiconductor wafers, wherein and contaminant-bearing gas stream 50 may be a process gas such as air, nitrogen, oxygen, argon, helium, hydrogen, or the like.

In some embodiments, gas stream input 30 is configured such that contaminant-bearing gas stream 50 entering at gas stream inlet 30 passes through vortexing apparatus 60, whereby contaminant-bearing gas stream 50 is induced to move in a helical flow 70. The helical flow 70 is around an axis generally parallel to the net motion 80 of the gas stream. As depicted in this embodiment, net motion 80 of the gas stream is vertically upward and the helical flow 70 of the gas stream is in a counterclockwise direction as viewed from above, however, any suitable orientation of the net motion of the gas stream or of the direction of the helical flow may be used. In some embodiments, gas stream input 30 enters scrubbing tower housing 25 at an acute angle so as to contribute to inducing contaminant-bearing gas stream 50 into a helical flow 70. In some embodiments, the inner surface of scrubbing tower housing 25 is generally cylindrical.

As schematically depicted in the embodiment of FIG. 1, vortexing apparatus 60 comprises a pair of stationary vanes. In various embodiments contemplated herein, the vortexing apparatus may be a passive vortexing apparatus comprising one, two, three, four, or more stationary vanes. In various other embodiments contemplated herein, the vortexing apparatus may be an active vortexing apparatus comprising one, two, three, four, or more mobile vanes, which may be driven by a motor or other drive mechanism. In some embodiments, while the inner surface of scrubbing tower housing 25 may be generally cylindrical, vortexing apparatus 60 comprises structures other than the inner cylindrical surface of scrubbing tower housing 25 or added to the inner cylindrical surface of scrubbing tower housing 25.

Figure 2:
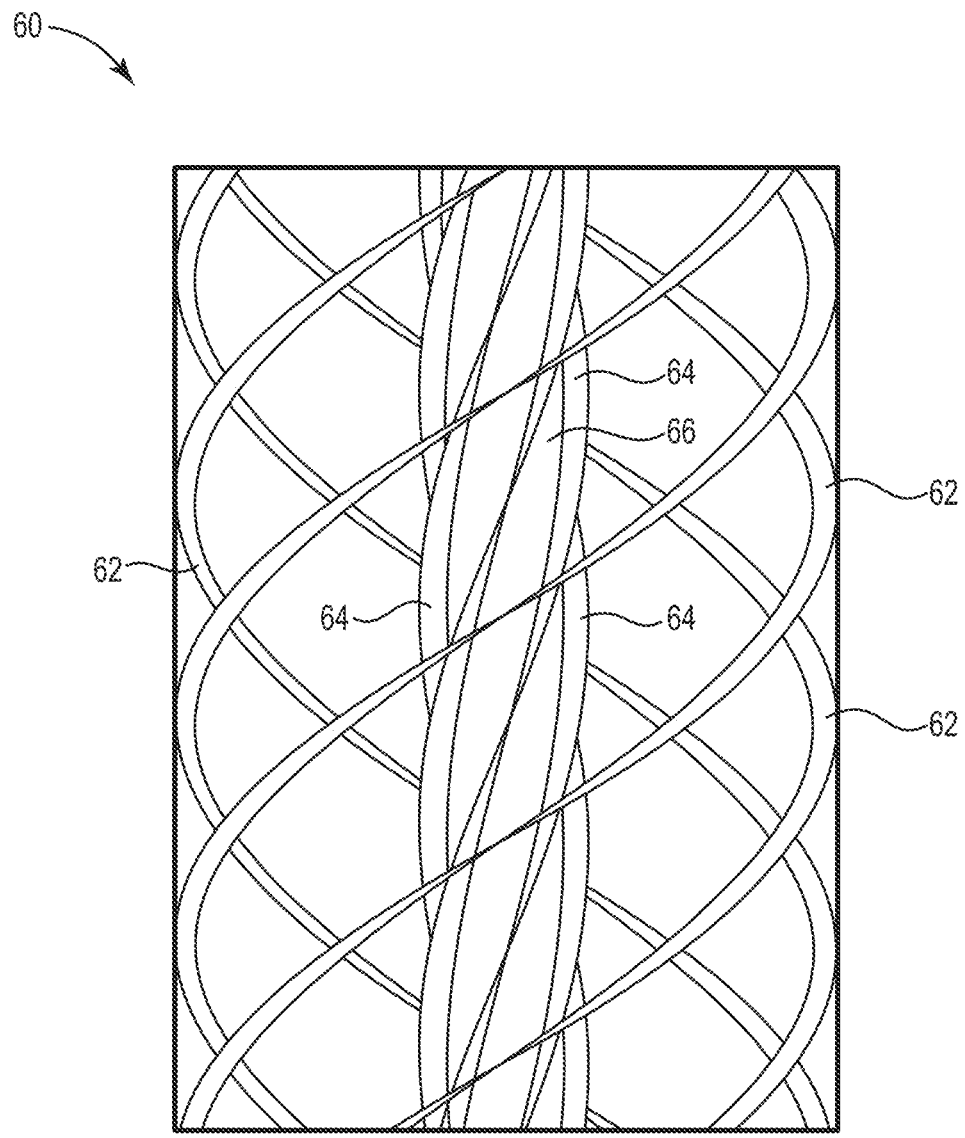
FIG. 2 is a schematic depiction of one embodiment of a vortexing apparatus according to the present disclosure.

With reference to FIG. 2, a further embodiment of vortexing apparatus 60 may comprise outer vortexing vanes 62 supported by the inner cylindrical surface of scrubbing tower housing 25, inner vortexing vanes 64 supported by support column 66. Various embodiments may include only outer vortexing vanes 62, only inner vortexing vanes 64, or both (as depicted). The width, pitch, and angle of inner vortexing vanes 64 and/or outer vortexing vanes 62 may be varied to suit the particular application.

Figure 3:
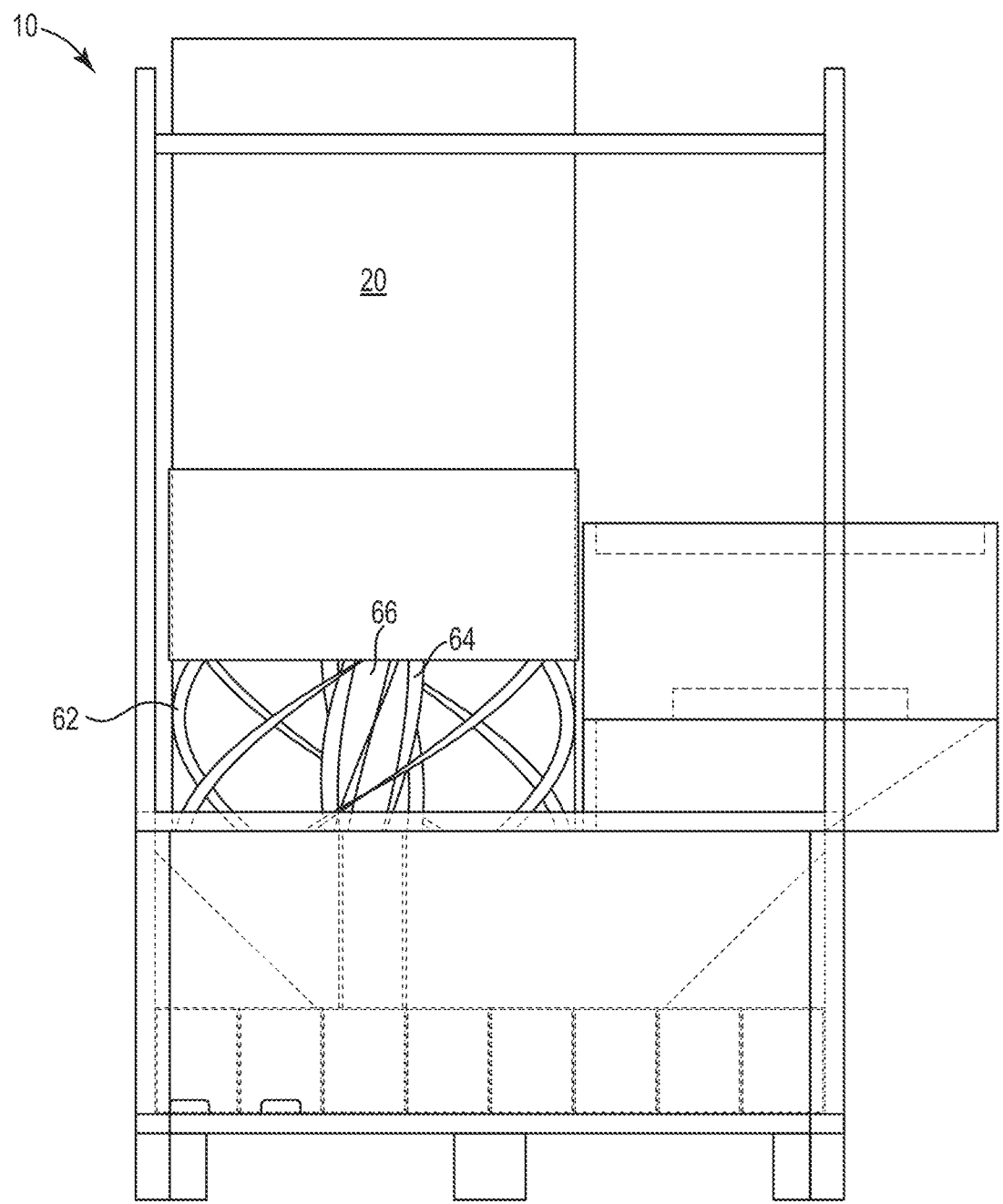
FIG. 3 is a schematic depiction of an active wet scrubbing filtration system according to the present disclosure wherein the scrubbing tower is cut away to reveal a vortexing apparatus.

FIG. 3 depicts elements of one active wet scrubbing filtration system 10 according to the present disclosure. Scrubbing tower 20 is cut away to reveal the vortexing apparatus of FIG. 2, comprising outer vortexing vanes 62, inner vortexing vanes 64, and support column 66.

Figure 4:
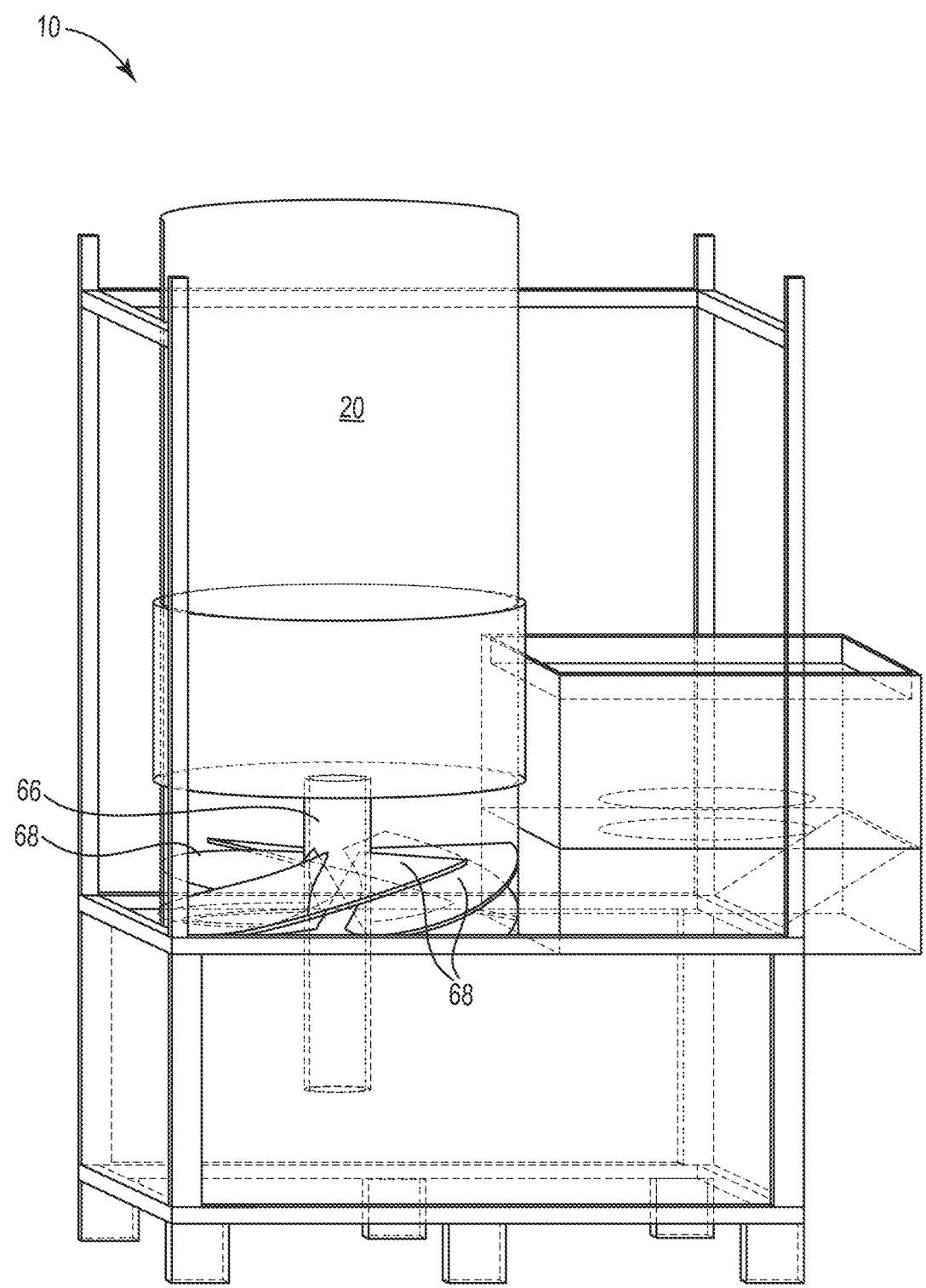
FIG. 4 is a schematic depiction of an active wet scrubbing filtration system according to the present disclosure wherein the scrubbing tower is cut away to reveal a vortexing apparatus.

FIG. 4 depicts elements of another active wet scrubbing filtration system 10 according to the present disclosure. Scrubbing tower 20 is cut away to reveal a vortexing apparatus comprising full radius vortexing vanes 68, which span the radius from support column 66 to the inner cylindrical surface of the scrubbing tower housing.

With further reference to FIG. 1 and the embodiment depicted therein, as a result of the vortexing apparatus 60, the contaminant-bearing gas stream is induced to impinge in a helical flow 70 upon absorption structure 90.

Absorption structure 90 is equipped with a scrubbing fluid application system. The scrubbing fluid application system comprises one or more absorption structure spray head(s) 120 configured to apply a flow of scrubbing fluid 130 to absorption structure 90. Absorption structure spray head(s) 120 are supplied with scrubbing fluid through scrubbing fluid supply conduit 230. Absorption structure 90 is a fluid-permeable, high surface area structure which brings the contaminant-bearing gas stream into intimate contact with scrubbing fluid such that contaminants are removed from the gas stream into the scrubbing fluid. Without wishing to be bound by theory, Applicants believe that the use of vortexing apparatus 60, which causes the contaminant-bearing gas stream to impinge in a helical flow 70 upon absorption structure 90, increases residence time of the gas stream in absorption structure 90, resulting in greater removal of contaminants from the gas stream.

In some embodiments, such as depicted in FIG. 1, the contaminant-bearing gas stream passes through an initial scrubbing fluid spray section before impinging upon absorption structure 90. The initial scrubbing fluid spray section comprises one or more initial spray head(s) 100 configured so as to project a spray of scrubbing fluid 110 into the contaminant-bearing gas stream, thereby removing contaminants from the gas stream into scrubbing fluid 110. Initial spray head(s) 100 are supplied with scrubbing fluid through scrubbing fluid supply conduit 240. Where an initial scrubbing fluid spray section is used, the use of vortexing apparatus 60, which induces the contaminant-bearing gas stream into a helical flow 70, increases residence time of the gas stream in the initial scrubbing fluid spray section resulting in greater removal of contaminants from the gas stream.

In some embodiments, such as depicted in FIG. 1, scrubbing fluid introduced into scrubbing tower 20 by one or both of absorption structure spray head(s) 120 or initial spray head(s) 100 collects, by gravity, in scrubbing fluid drain 210 from which it passes into scrubbing fluid return conduit 250. Scrubbing fluid return conduit 250 may be comprised in a scrubbing fluid recycling apparatus adapted to return scrubbing fluid to the scrubbing fluid application system for reuse as scrubbing fluid, as depicted in the embodiment of FIG. 1 and addressed below. Alternately, scrubbing fluid return conduit 250 may be directed to safely discard or store used scrubbing fluid bearing contaminants.

After passing through the absorption structure 90, the gas stream exits scrubbing tower 20 through gas stream output 140 as an at least partly decontaminated gas stream 150.

In some embodiments, the at least partly decontaminated gas stream 150 may be returned to external process 40 for use. In other embodiments, such as depicted in FIG. 1, the at least partly decontaminated gas stream 150 exiting scrubbing tower 20 then passes into condenser section 160. Condenser section 160 includes condenser section housing 170, condenser input 190, condenser output 200, and condenser apparatus 180, and in various embodiments comprises additional elements addressed below.

Condenser input 190 is configured to receive at least partly decontaminated gas stream 150 from gas stream output 140 of scrubbing tower 20. At least partly decontaminated gas stream 155 passes over condenser apparatus 180, and exits condenser section 160 through condenser output 200. Any suitable condenser apparatus 180 may be used, such as a condenser coil, as schematically depicted in FIG. 1. Condenser apparatus 180 typically requires connection to external apparatus such as a refrigeration unit. Condenser apparatus 180 may be equipped with structures that increase the area of contact with decontaminated gas stream 155, such as fins, vanes, gas-permeable structures, and the like. Condenser apparatus 180 at least partially removes dissolved or entrained scrubbing fluid from at least partly decontaminated gas stream 155. In some embodiments, such as depicted in FIG. 1, condensed scrubbing fluid collects, by gravity, in condensed scrubbing fluid drain 220 from which it passes into scrubbing fluid return conduit 250. Scrubbing fluid return conduit 250 may be comprised in a scrubbing fluid recycling apparatus adapted to return scrubbing fluid to the scrubbing fluid application system for reuse as scrubbing fluid, as depicted in the embodiment of FIG. 1 and addressed below. Alternately, scrubbing fluid return conduit 250 may be directed to safely discard or store used scrubbing fluid bearing contaminants.

The dried and at least partly decontaminated gas stream 260 may be returned to external process 40 for use through return duct 265.

In some embodiments, such as depicted in FIG. 1, the active wet scrubbing filtration system 10 includes a scrubbing fluid recycling apparatus which includes scrubbing fluid return conduit 250, configured to receive contaminant-bearing scrubbing fluid from scrubbing fluid drain 210 and optionally from condensed scrubbing fluid drain 220; at least one and potentially two scrubbing fluid decontamination systems 280, 281; and scrubbing fluid supply conduit 290 configured to feed scrubbing fluid supply conduits 230, 240.

In the embodiment depicted in FIG. 1, the scrubbing fluid recycling apparatus includes two scrubbing fluid decontamination systems 280, 281, which may be engaged or disengaged independently of each other by operation of valves 270, 271. Each of scrubbing fluid decontamination systems 280, 281, may be used to decontaminate the scrubbing fluid by passing the scrubbing fluid through one or more of filtration media, adsorption media, de-ionization apparatus, or other apparatus capable of removing contaminants. In some cases, either of scrubbing fluid decontamination systems 280, 281 may be regenerated in situ while the other is in use without interrupting the operation of active wet scrubbing filtration system 10 or external process 40. Alternately, decontamination media such as filtration media or adsorption media in either of scrubbing fluid decontamination systems 280, 281 may be changed while the other is in use.

A working system may additionally include elements not depicted in FIG. 1 whose operation is generally understood in the art, which may include reservoirs, pumps, valves, filters, de-ionizing units, ion exchange units, or temperature control units for scrubbing fluid; pumps, fans, impellers, baffles, filters, UV treatment units, mist eliminators, heat exchangers, or temperature control units for gas streams; analytical apparatus; apparatus for system monitoring; apparatus for automation of moving parts; or apparatus for addition of make-up scrubbing fluid or for addition of chemical additives to scrubbing fluid.

INDEX OF REFERENCE CHARACTERS FOR
FIG. 5

1100 process gas
1101 scrubbed gas flow
1102 contaminated liquid out
1103 condensed liquid out
1104 external water/liquid supply in
1105 cleaned additive/solvent mixture in
1106 liquid waste out
1110 scrubbing tower (with packed bed and cyclonic spray sections)
1120 external process
1130 drive fan
1131 inlet AMC pre-filter (condensable organics)
1132 pre-processing system (ex. UV with photocatalyst)
1140 mist eliminator
1141 thermoelectric cooling system
1142 non-condensing heat exchanger
1143 temperature and humidity control unit
1144 post-scrubbing AMC polishing filter bank
1145 recycled heat (thermoelectric cooler and heat exchange unit)
1146 purified re-humidification supply
1150 liquid storage tank
1151 liquid pump
1152 liquid UV purification/oxidation system
1153 electrolytic de-ionization system
1154 reverse osmosis (RO) membrane system
1155a high temp rotary selection valve 1
1155b high temp rotary selection valve 2
1156 inline gas heater (>400° C.)
1157a adsorbent bed 1 (GAC)
1157b adsorbent bed 2 (GAC)
1158 purified regeneration gas in
1159 waste gas
1160 liquid temperature control system
1170 chemical additive dispenser 1171a mixing valve 1
1171b mixing valve 2

Figure 5:
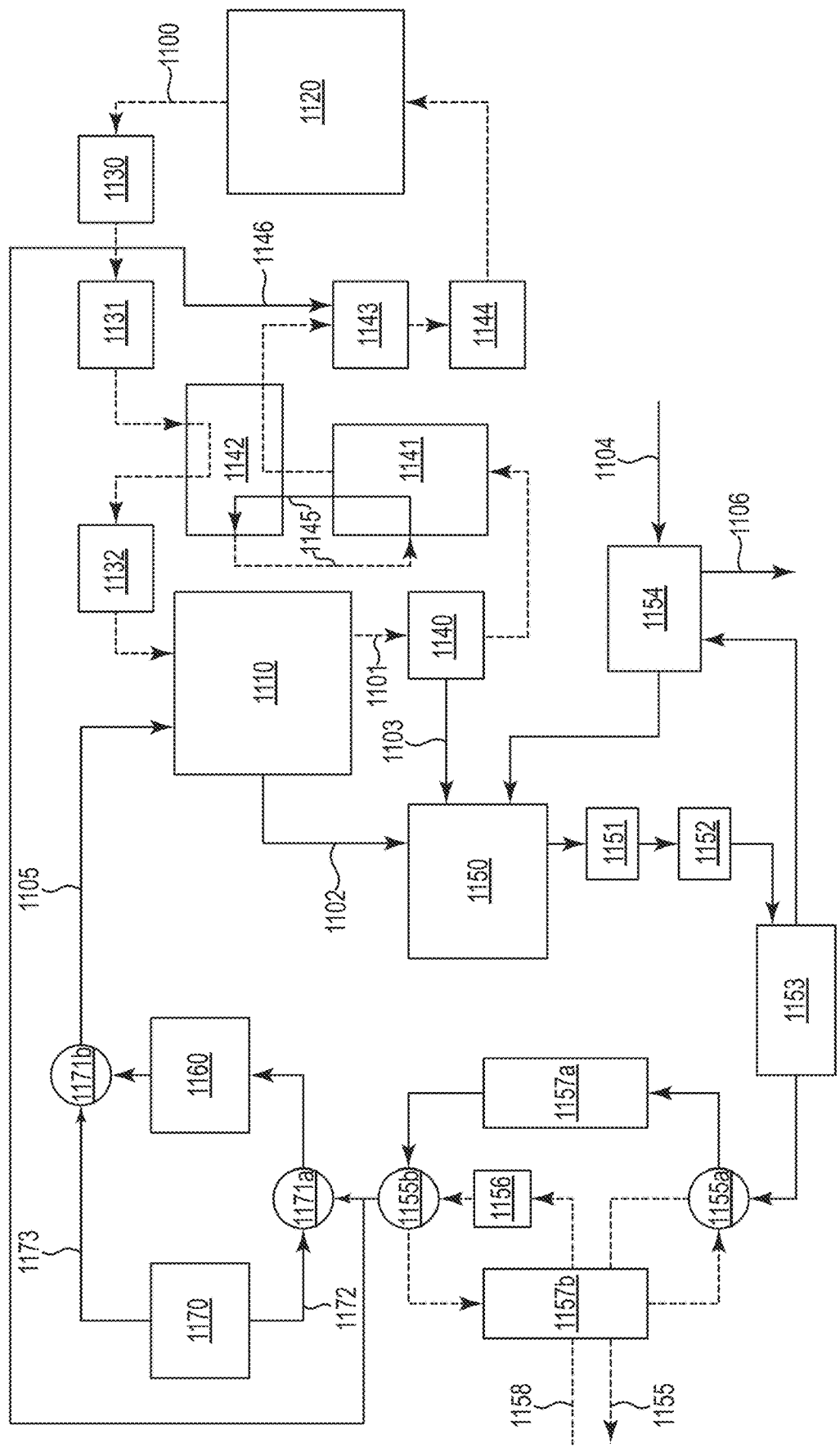
FIG. 5 is a schematic depiction of one embodiment of an active wet scrubbing filtration system according to the present disclosure.

FIG. 5 schematically depicts another embodiment of an active wet scrubbing filtration system according to the present disclosure and illustrates the location and use of additional components of such a system. Process gas 1100 from external process 1120 is driven by drive fan 1130 into inlet AMC (airborne molecular contamination) pre-filter 1131 for initial removal of condensable organics. The gas stream passes through non-condensing heat exchanger 1142. The gas stream then passes through pre-processing system 1132. Preprocessing system 1132 may include UV treatment for sterilization, optionally employing a photocatalyst. The gas stream then passes into scrubbing tower 1110, which includes a vortexing spray section comprising a vortexing section and initial scrubbing fluid spray section and an absorption structure. Scrubbed gas flow 1101 passes through, in order, mist eliminator 1140, thermoelectric cooling system 1141, non-condensing heat exchanger 1142, temperature and humidity control unit 1143, and post-scrubbing AMC polishing filter bank 1144 before return to external process 1120. Temperature and humidity control unit 1143 is fed by purified re-humidification supply 1146.

Liquid storage tank 1150 collects used scrubbing fluid from scrubbing tower 1110 through contaminated liquid out 1102 and condensed scrubbing fluid from mist eliminator 1140 through condensed liquid out 1103. The scrubbing fluid is cleaned and recycled as follows. Liquid from liquid storage tank 1150 passes through liquid pump 1151 and liquid UV purification/oxidation system 1152 to electrolytic de-ionization system 1153. Liquid from electrolytic de-ionization system 1153 may be circulated back to liquid storage tank 1150 through reverse osmosis (RO) membrane system 1154, which is served by external water/liquid supply in 1104 and liquid waste out 1106. Liquid from electrolytic de-ionization system 1153 to be recirculated to scrubbing tower 1110 is treated in one of adsorbent bed 1 (GAC) 1157a or adsorbent bed 2 (GAC) 1157b. Adsorbent beds may comprise granular activated carbon (GAC). Selection of one of the two adsorbent beds is accomplished by operation of high temp rotary selection valve 1 1155a and high temp rotary selection valve 2 1155b. The adsorbent bed not in use may be regenerated. The adsorbent bed not selected for operation is connected through high temp rotary selection valve 1 1155a and high temp rotary selection valve 2 1155b to purified regeneration gas in 1158, which passes purified regeneration gas through inline gas heater 1156 (typically operating in excess of 400° C.) to the adsorbent bed to be regenerated, and to waste gas 1159 which carries away the used regeneration gas.

Once liquid has been treated in one of adsorbent bed 1 (GAC) 1157a or adsorbent bed 2 (GAC) 1157b it may be sent through purified re-humidification supply 1146 to feed temperature and humidity control unit 1143. Clean liquid for reuse in scrubbing tower 1110 passes through liquid temperature control system 1160. Chemical additives may be added to the liquid from chemical additive dispenser 1170. Mixing valve 1 1171a and mixing valve 2 1171b are used to select the amount of additives added to the liquid before and after liquid temperature control system 1160. Cleaned additive/solvent mixture in 1105 delivers the cleaned mixture of fluid and additive to scrubbing tower 1110.

INDEX OF REFERENCE CHARACTERS FOR FIG. 6

Figure 6:
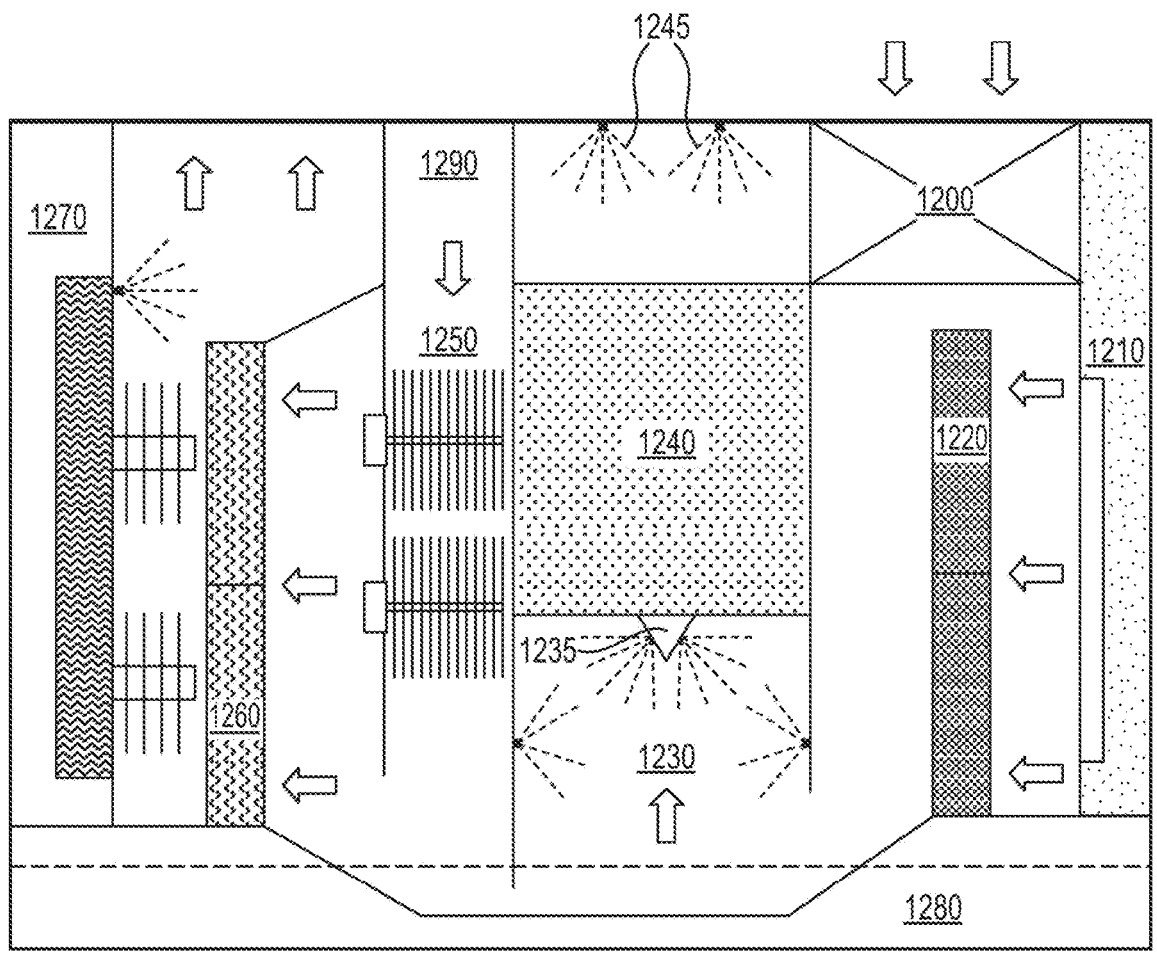
FIG. 6 is a schematic depiction of one embodiment of an active wet scrubbing filtration system according to the present disclosure.

1200 drive fan
1210 preprocessing system
1220 inlet AMC pre-filter
1230 vortexing spray section
1235 initial spray head
1240 absorption structure
1245 spray of scrubbing fluid
1250 condenser section
1260 post-scrubbing AMC polishing filter bank
1270 temperature and humidity control. unit
1280 liquid storage tank
1290 mist eliminator FIG. 6 depicts another embodiment of an active wet scrubbing filtration system according to the present disclosure and illustrates the location and use of additional components of such a system. The gas stream enters the system at drive fan 1200 which propels the gas stream through preprocessing system 1210. Preprocessing system 1210 may include UV treatment for sterilization, optionally employing a photocatalyst. The gas stream then passes into inlet AMC (airborne molecular contamination) pre-filter 1220 for initial removal of condensable organics. The gas stream then passes into vortexing spray section 1230, which comprises a vortexing section (not depicted) and initial scrubbing fluid spray section including initial spray head 1235. Induced into a helical flow by the vortexing section, the gas stream enters absorption structure 1240 which is wet by a spray of scrubbing fluid 1245. The gas stream then passes through mist eliminator 1290 into condenser section 1250. The gas stream then passes through post-scrubbing AMC polishing filter bank 1260 into temperature and humidity control unit 1270, and thereupon exits the active wet scrubbing filtration system. After use, scrubbing fluid collects by gravity in liquid storage tank 1280.

Selected Embodiments

The following embodiments, designated by letter and number, are intended to further illustrate the present disclosure but should not be construed to unduly limit this disclosure.

V1. An apparatus for decontamination of a gas stream, comprising:
  a) a gas stream input to receive a contaminant-bearing gas stream;
  b) a vortexing apparatus receiving the contaminant-bearing gas stream from the gas stream input and configured to induce the contaminant-bearing gas into a helical flow;
  c) an absorption structure equipped with a scrubbing fluid application system to apply a flow of scrubbing fluid to the absorption structure; wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream; and
  d) a gas stream output receiving the at least partly decontaminated gas stream and configured to deliver the at least partly decontaminated gas stream.

V2. The apparatus according to embodiment V1 wherein the vortexing apparatus is a passive vortexing apparatus comprising one or more stationary vanes.

V3. The apparatus according to embodiment V1 wherein the vortexing apparatus is an active vortexing apparatus comprising one or more mobile vanes.

V4. The apparatus according to any of embodiments V1-V3 wherein the helical flow is around an axis generally parallel to a net motion of the contaminant-bearing gas stream.

V5. The apparatus according to any of embodiments V1-V4 wherein the contaminant-bearing gas stream is drawn from a worksite and wherein the at least partly decontaminated gas stream is returned to the worksite.

D1. An apparatus for decontamination of a gas stream, comprising:
 a) a gas stream input to receive a contaminant-bearing gas stream;
 b) an absorption structure equipped with a scrubbing fluid application system to apply a flow of scrubbing fluid to the absorption structure; wherein the contaminant-bearing gas stream passing through the absorption structure thereby contacts the scrubbing fluid which at least partially removes contaminants from the gas stream to form an at least partly decontaminated gas stream; and
 c) a gas stream output receiving the at least partly decontaminated gas stream and configured to deliver the at least partly decontaminated gas stream;
 d) a first scrubbing fluid decontamination system operably connected to receive scrubbing fluid exiting the absorption structure, to decontaminate the scrubbing fluid, and to return the scrubbing fluid to the scrubbing fluid application system for reuse;
 e) a second scrubbing fluid decontamination system operably connected to receive scrubbing fluid exiting the absorption structure, to decontaminate the scrubbing fluid, and to return the scrubbing fluid to the scrubbing fluid application system for reuse;
wherein the first and the second scrubbing fluid decontamination systems may be engaged or disengaged independently of each other.

D2. The apparatus according to embodiment D1 wherein the contaminant-bearing gas stream is drawn from a worksite and wherein the at least partly decontaminated gas stream is returned to the worksite.

D3. The apparatus according to any of embodiments V1-V5 additionally comprising:
 e) a first scrubbing fluid decontamination system operably connected to receive scrubbing fluid exiting the absorption structure, to decontaminate the scrubbing fluid, and to return the scrubbing fluid to the scrubbing fluid application system for reuse;
 f) a second scrubbing fluid decontamination system operably connected to receive scrubbing fluid exiting the absorption structure, to decontaminate the scrubbing fluid, and to return the scrubbing fluid to the scrubbing fluid application system for reuse;
wherein the first and the second scrubbing fluid decontamination systems may be engaged or disengaged independently of each other.

S1. An apparatus for decontamination of a gas stream, comprising:
 a) a gas stream input to receive a contaminant-bearing gas stream;
 b) an initial scrubbing fluid spray section; configured so as to project a spray of scrubbing fluid into the contaminant-bearing gas stream;
 c) an absorption structure equipped with a scrubbing fluid application system to apply a flow of scrubbing fluid to the absorption structure; wherein the contaminant-bearing gas stream passing through the absorption structure thereby contacts the scrubbing fluid which at least partially removes contaminants from the gas stream to form an at least partly decontaminated gas stream; and
 d) a gas stream output receiving the at least partly decontaminated gas stream and configured to deliver the at least partly decontaminated gas stream;
wherein the scrubbing fluid application system and initial scrubbing fluid spray section are distinct and separate structures.

S2. The apparatus according to embodiment S1 wherein the scrubbing fluid application system and initial scrubbing fluid spray section are located at opposite ends of the absorption structure.

S3. The apparatus according to embodiment S1 or S2 wherein the contaminant-bearing gas stream is drawn from a worksite and wherein the at least partly decontaminated gas stream is returned to the worksite.

S4. The apparatus according to any of embodiments D1-D2 additionally comprising:
 f) an initial scrubbing fluid spray section; configured such that the contaminant-bearing gas stream entering at the gas stream inlet passes through the initial scrubbing fluid spray section before passing into the absorption structure; the initial scrubbing fluid spray section configured so as to project a spray of scrubbing fluid into the contaminant-bearing gas stream.

S5. The apparatus according to any of embodiments V1-V5 or D3 additionally comprising:
 g) an initial scrubbing fluid spray section; configured such that the contaminant-bearing gas stream induced into a helical flow by the vortexing apparatus passes through the initial scrubbing fluid spray section before passing into the absorption structure; the initial scrubbing fluid spray section configured so as to project a spray of scrubbing fluid into the contaminant-bearing gas stream.

S6. The apparatus according to embodiment S4 or S5 wherein the scrubbing fluid application system and initial scrubbing fluid spray section are located at opposite ends of the absorption structure.

C1. An apparatus for decontamination of a gas stream, comprising:
 a) a gas stream input to receive a contaminant-bearing gas stream;
 b) an absorption structure equipped with a scrubbing fluid application system to apply a flow of scrubbing fluid to the absorption structure; wherein the contaminant-bearing gas stream passing through the absorption structure thereby contacts the scrubbing fluid which at least partially removes contaminants from the gas stream to form an at least partly decontaminated gas stream;
 e) a condenser; wherein the at least partly decontaminated gas stream contacts the condenser which at least partially removes dissolved or entrained scrubbing fluid from the at least partly decontaminated gas stream; and
 d) a condenser output receiving the dried and at least partly decontaminated gas stream and configured to deliver the dried and at least partly decontaminated gas stream.

C2. The apparatus according to embodiment C1 additionally comprising a condensed scrubbing fluid recycling apparatus adapted to collect condensed scrubbing fluid removed from the at least partly decontaminated gas stream by the action of the condenser and return the condensed scrubbing fluid to the scrubbing fluid application system for reuse as scrubbing fluid.

C3. The apparatus according to embodiment C1 or C2 wherein the contaminant-bearing gas stream is drawn from a worksite and wherein the dried and at least partly decontaminated gas stream is returned to the worksite.

C4. The apparatus according to any of embodiments V1-V5, D1-D3, or S1-S6 additionally comprising:

h) a condenser; configured such that the at least partially decontaminated gas stream exiting the gas stream output contacts the condenser which at least partially removes dissolved or entrained scrubbing fluid from the at least partly decontaminated gas stream; and i) a condenser output receiving the dried and at least partly decontaminated gas stream and configured to deliver the dried and at least partly decontaminated gas stream.

C5. The apparatus according to embodiment C4 additionally comprising a condensed scrubbing fluid recycling apparatus adapted to collect condensed scrubbing fluid removed from the at least partly decontaminated gas stream by the action of the condenser and return the condensed scrubbing fluid to the scrubbing fluid application system for reuse as scrubbing fluid.

C6. The apparatus according to embodiment C4 or C5 wherein the contaminant-bearing gas stream is drawn from a worksite and wherein the dried and at least partly decontaminated gas stream is returned to the worksite.

A1. The apparatus according to any of the preceding embodiments wherein the contaminant-bearing gas stream comprises air.

A2. The apparatus according to any of the preceding embodiments wherein the scrubbing fluid comprises water.

A3. The apparatus according to any of the preceding embodiments wherein the scrubbing fluid comprises de-ionized (DI) water.

A4. The apparatus according to any of the preceding embodiments wherein the scrubbing fluid comprises chemisorptive aqueous solutions.

A5. The apparatus according to any of the preceding embodiments wherein the worksite comprises a clean room.

A6. The apparatus according to any of the preceding embodiments wherein the worksite comprises a semiconductor processing tool.

A7. The apparatus according to any of the preceding embodiments wherein the worksite comprises a photolithography tool or photolithography tool cluster.

MV1. A method for decontamination of a gas stream, comprising:

a) passing a contaminant-bearing gas stream through a vortexing apparatus configured to induce the contaminant-bearing gas into a helical flow;

b) passing the contaminant-bearing gas stream through an absorption structure equipped with a scrubbing fluid application system to apply a flow of scrubbing fluid to the absorption structure; wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream.

MV2. The method according to embodiment MV1 wherein the vortexing apparatus is a passive vortexing apparatus comprising one or more stationary vanes.

MV3. The method according to embodiment MV1 wherein the vortexing apparatus is an active vortexing apparatus comprising one or more mobile vanes.

MV4. The method according to any of embodiments MV1-MV3 wherein the helical flow is around an axis generally parallel to a net motion of the contaminant-bearing gas stream.

MV5. The method according to any of embodiments MV1-MV4 wherein the contaminant-bearing gas stream is drawn from a worksite and wherein the at least partly decontaminated gas stream is returned to the worksite.

MD1. A method for decontamination of a gas stream, comprising:

a) passing a contaminant-bearing gas stream through an absorption structure equipped with a scrubbing fluid application system to apply a flow of scrubbing fluid to the absorption structure, wherein the contaminant-bearing gas stream passes through the absorption structure thereby contacts the scrubbing fluid which at least partially removes contaminants from the gas stream to form an at least partly decontaminated gas stream;

b) passing scrubbing fluid through one or both of: a first scrubbing fluid decontamination system operably connected to receive scrubbing fluid exiting the absorption structure, to decontaminate the scrubbing fluid, and to return the scrubbing fluid to the scrubbing fluid application system for reuse; and a second scrubbing fluid decontamination system operably connected to receive scrubbing fluid exiting the absorption structure, to decontaminate the scrubbing fluid, and to return the scrubbing fluid to the scrubbing fluid application system for reuse; wherein the first and the second scrubbing fluid decontamination systems may be engaged or disengaged independently of each other.

MD2. The method according to embodiment MD1 wherein the contaminant-bearing gas stream is drawn from a worksite and wherein the at least partly decontaminated gas stream is returned to the worksite.

MD3. The method according to any of embodiments MV1-MV5 additionally comprising:

c) passing scrubbing fluid through one or both of: a first scrubbing fluid decontamination system operably connected to receive scrubbing fluid exiting the absorption structure, to decontaminate the scrubbing fluid, and to return the scrubbing fluid to the scrubbing fluid application system for reuse; and a second scrubbing fluid decontamination system operably connected to receive scrubbing fluid exiting the absorption structure, to decontaminate the scrubbing fluid, and to return the scrubbing fluid to the scrubbing fluid application system for reuse; wherein the first and the second scrubbing fluid decontamination systems may be engaged or disengaged independently of each other.

MS1. A method for decontamination of a gas stream, comprising:

a) passing a contaminant-bearing gas stream through an initial scrubbing fluid spray section configured so as to project a spray of scrubbing fluid into the contaminant-bearing gas stream;

b) passing a contaminant-bearing gas stream through an absorption structure equipped with a scrubbing fluid application system to apply a flow of scrubbing fluid to the absorption structure, wherein the contaminant-bearing gas stream passes through the absorption structure thereby contacts the scrubbing fluid which at least partially removes contaminants from the gas stream to form an at least partly decontaminated gas stream;

wherein the scrubbing fluid application system and initial scrubbing fluid spray section are distinct and separate structures.

MS2. The method according to embodiment MS1 wherein the scrubbing fluid application system and initial scrubbing fluid spray section are located at opposite ends of the absorption structure.

MS3. The method according to embodiment MS1 or MS2 wherein the contaminant-bearing gas stream is drawn from a worksite and wherein the at least partly decontaminated gas stream is returned to the worksite.

MS4. The method according to any of embodiments MD1-MD2 additionally comprising:

c) passing a contaminant-bearing gas stream through an initial scrubbing fluid spray section configured so as to project a spray of scrubbing fluid into the contaminant-bearing gas stream.

MS5. The method according to any of embodiments MV1-MV5 or MD3 additionally comprising:

d) passing a contaminant-bearing gas stream through an initial scrubbing fluid spray section configured so as to project a spray of scrubbing fluid into the contaminant-bearing gas stream.

MS6. The method according to embodiment MS4 or MS5 wherein the scrubbing fluid application system and initial scrubbing fluid spray section are located at opposite ends of the absorption structure.

MC1. A method for decontamination of a gas stream, comprising:

a) passing a contaminant-bearing gas stream through an absorption structure equipped with a scrubbing fluid application system to apply a flow of scrubbing fluid to the absorption structure, wherein the contaminant-bearing gas stream passes through the absorption structure thereby contacts the scrubbing fluid which at least partially removes contaminants from the gas stream to form an at least partly decontaminated gas stream;

b) passing the at least partly decontaminated gas stream through a condenser; wherein the at least partly decontaminated gas stream contacts the condenser which at least partially removes dissolved or entrained scrubbing fluid from the at least partly decontaminated gas stream.

MC2. The method according to embodiment MC1 additionally comprising:

c) collecting condensed scrubbing fluid removed from the at least partly decontaminated gas stream by the action of the condenser and return the condensed scrubbing fluid to the scrubbing fluid application system for reuse as scrubbing fluid.

MC3. The method according to embodiment MC1 or MC2 wherein the contaminant-bearing gas stream is drawn from a worksite and wherein the dried and at least partly decontaminated gas stream is returned to the worksite.

MC4. The method according to any of embodiments MV1-MV5, MD1-MD3, or MS1-MS6 additionally comprising:

e) passing the at least partly decontaminated gas stream through a condenser; wherein the at least partly decontaminated gas stream contacts the condenser which at least partially removes dissolved or entrained scrubbing fluid from the at least partly decontaminated gas stream.

MC5. The method according to embodiment MC4 additionally comprising:

collecting condensed scrubbing fluid removed from the at least partly decontaminated gas stream by the action of the condenser and return the condensed scrubbing fluid to the scrubbing fluid application system for reuse as scrubbing fluid.

MC6. The method according to embodiment MC4 or MC5 wherein the contaminant-bearing gas stream is drawn from a worksite and wherein the dried and at least partly decontaminated gas stream is returned to the worksite.

MA1. The method according to any of the preceding embodiments wherein the contaminant-bearing gas stream comprises air.

MA2. The method according to any of the preceding embodiments wherein the scrubbing fluid comprises water.

MA3. The method according to any of the preceding embodiments wherein the scrubbing fluid comprises de-ionized (DI) water.

MA4. The method according to any of the preceding embodiments wherein the scrubbing fluid comprises chemisorptive aqueous solutions.

MA5. The method according to any of the preceding embodiments wherein the worksite comprises a clean room.

MA6. The method according to any of the preceding embodiments wherein the worksite comprises a semiconductor processing tool.

MA7. The method according to any of the preceding embodiments wherein the worksite comprises a photolithography tool or photolithography tool cluster.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. An apparatus for decontamination of a gas stream, comprising:
   a) a gas stream input to receive a contaminant-bearing gas stream;
   b) a vortexing apparatus receiving the contaminant-bearing gas stream from the gas stream input and configured to induce the contaminant-bearing gas into a helical flow;
   c) an absorption structure equipped with a scrubbing fluid application system to apply a flow of scrubbing fluid to the absorption structure, wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream;
   d) a gas stream output receiving the at least partly decontaminated gas stream and configured to deliver the at least partly decontaminated gas stream;
   e) a first scrubbing fluid decontamination system operably connected to receive scrubbing fluid exiting the absorption structure and configured to decontaminate the scrubbing fluid and to return the scrubbing fluid to the scrubbing fluid application system for reuse; and
   f) a second scrubbing fluid decontamination system operably connected to receive scrubbing fluid exiting the absorption structure and configured to decontaminate the scrubbing fluid and to return the scrubbing fluid to the scrubbing fluid application system for reuse, wherein the first and the second scrubbing fluid decontamination systems may be engaged or disengaged independently of each other.

2. The apparatus according to claim 1, wherein the vortexing apparatus is a passive vortexing apparatus comprising one or more stationary vanes.

3. The apparatus according to claim 1, wherein the helical flow is around an axis parallel to a net motion of the contaminant-bearing gas stream.

4. The apparatus according to claim 1, wherein the contaminant-bearing gas stream is drawn from a worksite and wherein the at least partly decontaminated gas stream is returned to the worksite.

5. The apparatus according to claim 1, further comprising:
   g) an initial scrubbing fluid spray section positioned between the vortexing apparatus and the absorption structure such that the contaminant-bearing gas stream induced into a helical flow by the vortexing apparatus passes through the initial scrubbing fluid spray section before passing into the absorption structure, wherein the initial scrubbing fluid spray section is configured so as to project a spray of scrubbing fluid into the contaminant-bearing gas stream.

6. The apparatus according to claim 5, wherein the scrubbing fluid application system and initial scrubbing fluid spray section are located at opposite ends of the absorption structure.

7. The apparatus according to claim 5, further comprising:
h) a condenser; configured such that the at least partially decontaminated gas stream exiting the gas stream output contacts the condenser which at least partially removes dissolved or entrained scrubbing fluid from the at least partly decontaminated gas stream.

8. The apparatus according to claim 7, further comprising a condensed scrubbing fluid recycling apparatus adapted to collect condensed scrubbing fluid removed from the at least partly decontaminated gas stream by the action of the condenser and to return the condensed scrubbing fluid to the scrubbing fluid application system for reuse as scrubbing fluid.

9. The apparatus according to claim 7, wherein the contaminant-bearing gas stream is drawn from a worksite and wherein the dried and at least partly decontaminated gas stream is returned to the worksite.

10. The apparatus according to claim 1, wherein the contaminant-bearing gas stream comprises air.

11. The apparatus according to claim 1, wherein the scrubbing fluid comprises water.

12. The apparatus according to claim 1, wherein the scrubbing fluid comprises de-ionized (DI) water.

13. The apparatus according to claim 1, wherein the scrubbing fluid comprises chemisorptive aqueous solutions.

14. The apparatus according to claim 1, further comprising:
an initial scrubbing fluid spray section positioned between the vortexing apparatus and the absorption structure such that the contaminant-bearing gas stream induced into a helical flow by the vortexing apparatus passes through the initial scrubbing fluid spray section before passing into the absorption structure, wherein the initial scrubbing fluid spray section is configured so as to project a spray of scrubbing fluid into the contaminant-bearing gas stream.

15. An apparatus for decontamination of a gas stream, comprising:
a) a gas stream input to receive a contaminant-bearing gas stream;
b) a vortexing apparatus receiving the contaminant-bearing gas stream from the gas stream input and configured to induce the contaminant-bearing gas into a helical flow;
c) an absorption structure equipped with a scrubbing fluid application system to apply a flow of scrubbing fluid to the absorption structure, wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream;
d) a gas stream output receiving the at least partly decontaminated gas stream and configured to deliver the at least partly decontaminated gas stream,
wherein the vortexing apparatus is an active vortexing apparatus comprising one or more mobile vanes.

16. An apparatus for decontamination of a gas stream comprising:
a) a gas stream input to receive a contaminant-bearing gas stream;
b) a vortexing apparatus receiving the contaminant-bearing gas stream from the gas stream input and configured to induce the contaminant-bearing gas into a helical flow;
c) an absorption structure equipped with a scrubbing fluid application system to apply a flow of scrubbing fluid to the absorption structure, wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream;
d) a gas stream output receiving the at least partly decontaminated gas stream and configured to deliver the at least partly decontaminated gas stream;
e) an initial scrubbing fluid spray section positioned between the vortexing apparatus and the absorption structure such that the contaminant-bearing gas stream induced into a helical flow by the vortexing apparatus passes through the initial scrubbing fluid spray section before passing into the absorption structure, wherein the initial scrubbing fluid spray section is configured so as to project a spray of scrubbing fluid into the contaminant-bearing gas stream; and
f) a condenser; configured such that the at least partially decontaminated gas stream exiting the gas stream output contacts the condenser which at least partially removes dissolved or entrained scrubbing fluid from the at least partly decontaminated gas stream.

17. An apparatus for decontamination of a gas stream comprising:
a) a gas stream input to receive a contaminant-bearing gas stream;
b) a vortexing apparatus receiving the contaminant-bearing gas stream from the gas stream input and configured to induce the contaminant-bearing gas into a helical flow;
c) an absorption structure equipped with a scrubbing fluid application system to apply a flow of scrubbing fluid to the absorption structure, wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream;
d) a gas stream output receiving the at least partly decontaminated gas stream and configured to deliver the at least partly decontaminated gas stream;
e) an initial scrubbing fluid spray section positioned between the vortexing apparatus and the absorption structure such that the contaminant-bearing gas stream induced into a helical flow by the vortexing apparatus passes through the initial scrubbing fluid spray section before passing into the absorption structure, wherein the initial scrubbing fluid spray section is configured so as to project a spray of scrubbing fluid into the contaminant-bearing gas stream;
f) a first scrubbing fluid decontamination system operably connected to receive scrubbing fluid exiting the absorption structure and configured to decontaminate the scrubbing fluid and to return the scrubbing fluid to the scrubbing fluid application system for reuse; and g) a second scrubbing fluid decontamination system operably connected to receive scrubbing fluid exiting the absorption structure and configured to decontaminate the scrubbing fluid and to return the scrubbing fluid to the scrubbing fluid application system for reuse, wherein the first and the second scrubbing fluid decontamination systems may be engaged or disengaged independently of each other.

18. An apparatus for decontamination of a gas stream comprising:
   a) a gas stream input to receive a contaminant-bearing gas stream;
   b) a vortexing apparatus receiving the contaminant-bearing gas stream from the gas stream input and configured to induce the contaminant-bearing gas into a helical flow;
   c) an absorption structure equipped with a scrubbing fluid application system to apply a flow of scrubbing fluid to the absorption structure, wherein the contaminant-bearing gas stream is directed to impinge the absorption structure in a helical flow by the vortexing apparatus and passes through the absorption structure thereby contacting the scrubbing fluid which at least partially removes contaminants from the gas stream to form an at least partly decontaminated gas stream;
   d) a gas stream output receiving the at least partly decontaminated gas stream and configured to deliver the at least partly decontaminated gas stream; and
   e) a condenser; configured such that the at least partially decontaminated gas stream exiting the gas stream output contacts the condenser which at least partially removes dissolved or entrained scrubbing fluid from the at least partly decontaminated gas stream.

* * * * *